(12) United States Patent
Kim et al.

(10) Patent No.: US 11,225,135 B2
(45) Date of Patent: Jan. 18, 2022

(54) FLAP POSITION SENSING DEVICE OF ACTIVE AIR FLAP SYSTEM AND METHOD OF MANUFACTURING THE SAME

(71) Applicant: TSMOST CO., LTD., Cheonan-si (KR)

(72) Inventors: Choon Sik Kim, Cheonan-si (KR); Sung Jun Kim, Cheonan-si (KR); Hee Sung Lee, Cheonan-si (KR)

(73) Assignee: TSMOST CO., LTD., Cheonan-si (KR)

( * ) Notice: Subject to any disclaimer, the term of this patent is extended or adjusted under 35 U.S.C. 154(b) by 45 days.

(21) Appl. No.: 16/737,143

(22) Filed: Jan. 8, 2020

(65) Prior Publication Data
US 2020/0215900 A1  Jul. 9, 2020

(30) Foreign Application Priority Data
Jan. 8, 2019  (KR) .......................... 10-2019-0002198

(51) Int. Cl.
| | | |
|---|---|---|
| B60K 11/00 | (2006.01) | |
| B60K 11/08 | (2006.01) | |
| B60K 11/06 | (2006.01) | |
| B60K 11/04 | (2006.01) | |
| B60R 19/52 | (2006.01) | |
| F01P 7/10 | (2006.01) | |

(52) U.S. Cl.
CPC ............ *B60K 11/085* (2013.01); *B60K 11/06* (2013.01); *B60K 11/04* (2013.01); *B60R 19/52* (2013.01); *B60R 2019/525* (2013.01); *F01P 7/10* (2013.01)

(58) Field of Classification Search
CPC ........ B60K 17/97; B60K 11/085; B60K 1/04; B60K 11/06; B60R 19/52; F01P 7/10

USPC ...................................................... 180/68.1
See application file for complete search history.

(56) References Cited

U.S. PATENT DOCUMENTS

| | | | | |
|---|---|---|---|---|
| 4,738,327 | A * | 4/1988 | Takei ................... | B60K 11/04 180/53.7 |
| 8,607,744 | B2 * | 12/2013 | Alexander ....... | F02M 35/10301 123/41.05 |
| 8,794,360 | B2 * | 8/2014 | Nemoto ............... | B60K 11/085 180/68.1 |

(Continued)

FOREIGN PATENT DOCUMENTS

| | | |
|---|---|---|
| EP | 1001248 A2 | 5/2000 |
| KR | 10-2002-0045262 A | 6/2002 |

(Continued)

*Primary Examiner* — Hau V Phan
(74) *Attorney, Agent, or Firm* — Novick, Kim & Lee, PLLC; Jae Younkim (57) ABSTRACT

A flap position sensing device of an active air flap system, and a method of manufacturing the same are described. The flap position sensing device includes a rotating body, a sensor casing, a first hall sensor and a second hall sensor, and a first permanent magnet and a second permanent magnet. The rotating body is formed of a resin material, and rotates the flap by receiving torque while the rotating body is coaxially fixed to a rotation shaft of the flap. The sensor casing is formed of a resin material, and is fixed to the housing to rotatably support the rotating body. The first hall sensor and the second hall sensor are integrally formed with the sensor casing by injection molding, and are disposed corresponding to an open position and a closed position, respectively, of the flap.

5 Claims, 12 Drawing Sheets

(56) References Cited

U.S. PATENT DOCUMENTS

| | | | | |
|---|---|---|---|---|
| 2006/0267376 A1* | 11/2006 | McKnight | ............ | B60K 11/085 |
| | | | | 296/180.5 |
| 2007/0199751 A1* | 8/2007 | Bradley | ............... | B60K 11/085 |
| | | | | 180/68.1 |
| 2012/0240878 A1* | 9/2012 | Hagele | .................. | F04D 29/362 |
| | | | | 123/41.11 |
| 2015/0048644 A1* | 2/2015 | Georgi | ................... | H03K 17/97 |
| | | | | 296/97.22 |
| 2015/0053027 A1* | 2/2015 | Downs | ................ | B60K 17/344 |
| | | | | 74/15.4 |
| 2015/0197147 A1* | 7/2015 | Koh | ....................... | H02K 1/146 |
| | | | | 180/68.1 |
| 2016/0214507 A1* | 7/2016 | Heeg | .................... | B60N 2/0244 |
| 2017/0074158 A1* | 3/2017 | Nowak | ................. | F16K 31/043 |

FOREIGN PATENT DOCUMENTS

| | | |
|---|---|---|
| KR | 10-2014-0025097 A | 3/2014 |
| KR | 10-2015-0053133 A | 5/2015 |
| KR | 10-1632720 B1 | 6/2016 |
| KR | 10-2019-0002198 A | 1/2019 |

\* cited by examiner

FLAP POSITION SENSING DEVICE OF ACTIVE AIR FLAP SYSTEM AND METHOD OF MANUFACTURING THE SAME

CROSS-REFERENCE TO RELATED APPLICATION(S)

This application claims priority from Korean Patent Application No. 10-2019-0002198, filed on Jan. 8, 2019, in the Korean Intellectual Property Office, the entire disclosure of which is incorporated herein by reference for all purposes.

BACKGROUND

1. Field

The following description relates to a sensor for sensing positions of a flap which is employed in an active air flap system for actively adjusting an amount of outside air, introduced into a vehicle engine room, according to vehicle driving conditions.

2. Description of the Related Art

Generally, an engine room has a radiator for circulating and cooling coolant which absorbs heat from the engine, and a radiator grille, serving as a vent for drawing air required for cooling in the radiator, is provided at a front portion of a vehicle body.

Recently, a vehicle is provided with an active air flap (AAF) system for actively adjusting an amount of outside air, introduced into a vehicle engine room through the radiator grille, according to vehicle driving conditions.

The active air flap system closes an air inlet, which is used for introducing outside air, at the initial starting time of the engine and until the engine temperature reaches a predetermined level, thereby helping to boost aerodynamics and fuel efficiency. Furthermore, when the engine temperature reaches a predetermined level or higher, the active air flap system opens the air inlet for introducing outside air to help cool the engine. In addition, the active air flap system may reduce air resistance by properly adjusting the airflow during high speed travel of the vehicle. Such active air flap system has a flap which rotates to open and close the radiator grille, and an actuator for rotating the flap. However, if the flap does not rotate normally due to external factors or damage to the flap, the active air flap system may not operate the functions properly.

Particularly, if the flap is not opened by the actuator while the flap closes the radiator grille, the outside air required for cooling the engine may not be introduced, causing serious problems such as an overheated engine. Accordingly, there is a need for a method of accurately sensing whether the flap is an open position, a closed position, and other positions.

SUMMARY

It is an object of the present invention to provide a flap position sensing device of an active air flap system for accurately sensing whether a flap is in an open position, a closed position, and other positions, and a method of manufacturing the same.

In accordance with one aspect of the present invention, the above object is accomplished by providing a flap position sensing device of an active air flap system including a housing having an air inlet which allows outside air entering through a radiator grille to pass, at least one flap which rotates to reciprocate between a position opening the air inlet of the housing and a position for closing the air inlet of the housing, and a flap actuator for rotating the flap, the flap position sensing device including a rotating body, a sensor casing, a first hall sensor and a second hall sensor, and a first permanent magnet and a second permanent magnet. The rotating body is formed of a resin material, and rotates the flap by receiving torque while the rotating body is coaxially fixed to a rotation shaft of the flap. The sensor casing is formed of a resin material, and is fixed to the housing to rotatably support the rotating body. The first hall sensor and the second hall sensor are integrally formed with the sensor casing by insert injection molding, and are disposed corresponding to an open position and a closed position, respectively, of the flap. The first permanent magnet and the second permanent magnet are integrally formed with the rotating body by insert injection molding, are spaced apart from each other by an opening and closing angle of the flap, and are disposed to interact with the first hall sensor and the second hall sensor according to opening and closing of the flap, so as to sense the open position, the closed position, and other positions of the flap.

In accordance with another aspect of the present invention, the above object is also accomplished by providing a method of manufacturing a flap position sensing device of an active air flap system including a housing having an air inlet which allows outside air entering through a radiator grille to pass, at least one flap which rotates to reciprocate between a position for opening the air inlet of the housing and a position for closing the air inlet of the housing, and a flap actuator for rotating the flap, the method including: during injection molding of a sensor casing, while a first hall sensor and a second hall sensor are spaced apart from each other by an opening and closing angle of the flap, the first hall sensor and the second hall sensor are inserted to be integrally formed with the sensor casing; and during the injection molding of a rotating body, while a first permanent magnet and a second permanent magnet are spaced apart from each other by an opening and closing angle of the flap, and are disposed to interact with the first hall sensor and the second hall sensor to sense an open position, a closed position, and other positions of the flap, the first permanent magnet and the second permanent magnet are inserted to be integrally formed with the rotating body.

Effects of the Invention

According to the present invention, the flap position sensing device may accurately sense whether the flap is in an open position, a closed position, and other positions, such that an abnormality in the flap may be detected, and appropriate actions may be performed. Furthermore, the present invention has an effect in that the hall sensors may be integrally formed with the sensor casing, thereby preventing breakdown due to water permeation, and reducing manufacturing process and the size of the flap position sensing device without requiring a printed circuit board. In addition, according to the present invention, the number of connector terminals connected to the hall sensors may be reduced, such that the size of the flap position sensing device may be reduced.

DETAILED DESCRIPTION

Hereinafter, embodiments of the present disclosure will be described in detail with reference to the accompanying drawings. It should be noted that, in the drawings, the same reference symbols refer to same parts, even in different drawings. In the following description, a redundant description and a detailed description of known functions and configurations incorporated herein will be omitted when it may obscure the subject matter of the present invention. The following detailed description is provided to assist the reader in gaining a comprehensive understanding of the methods, apparatuses, and/or systems described herein. Accordingly, in the drawings, the shapes and dimensions of elements may be exaggerated for clarity.

Figure 1:
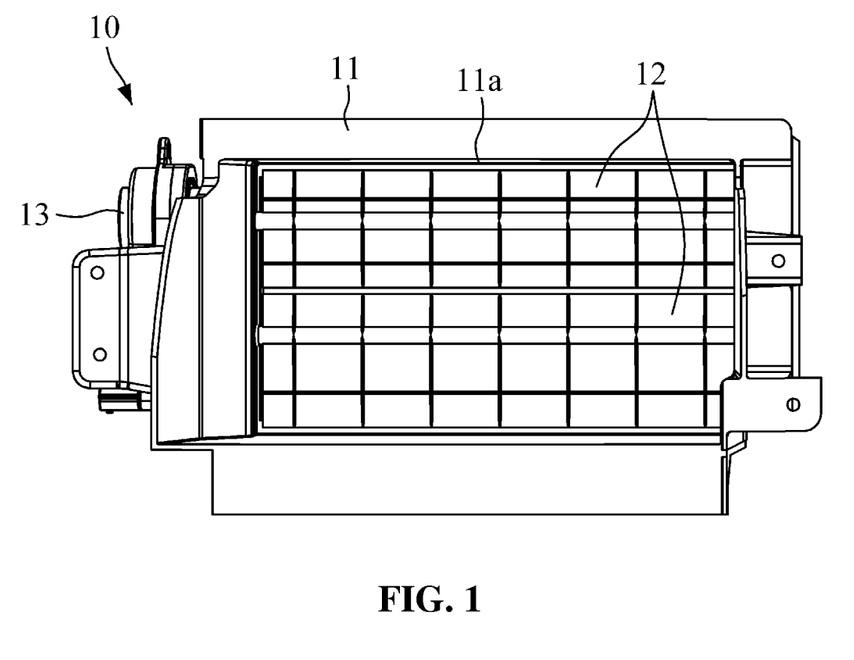
FIG. 1 is a front view of an example of an active air flap system which employs a flap position sensing device according to an embodiment of the present invention.
Figure 2:
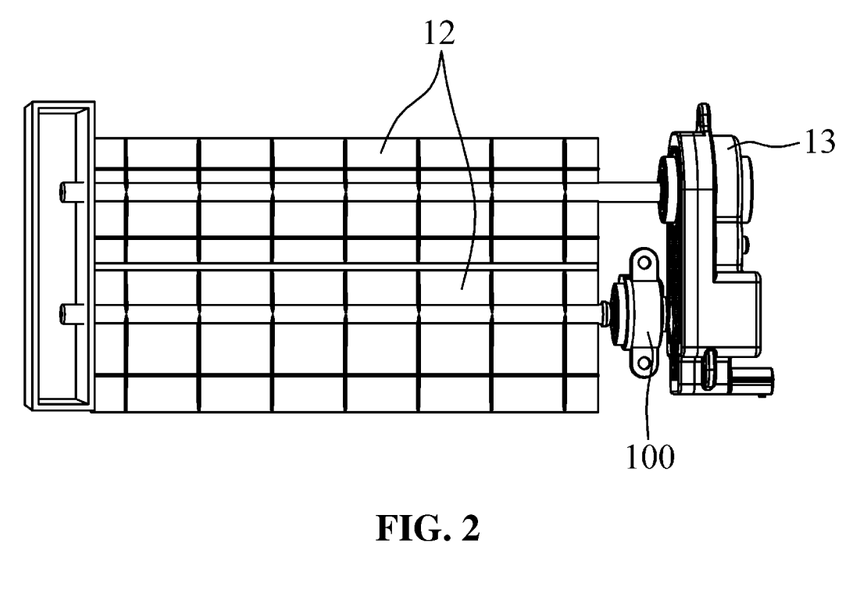
FIG. 2 is a rear view of FIG. 1.

FIG. 1 is a front view of an example of an active air flap system which employs a flap position sensing device according to an embodiment of the present invention. FIG. 2 is a rear view of FIG. 1.

The active air flap system 10 illustrated in FIGS. 1 and 2 includes a housing 11, at least one flap 12, and a flap actuator 13.

The housing 11 has an air inlet 11a which allows outside air entering through a radiator grille to pass. The housing 11 is disposed between the radiator grille and a vehicle engine room, so that the outside air, passing through the radiator grille, may flow into the engine room through the air inlet 11a.

The flap 12 rotates to reciprocate between a position for opening the air inlet 11a and a position for closing the air inlet 11a. In the air inlet 11a of the housing 11, a left side and a right side of the flap 12 are connected to the housing 11 to be rotatable about a horizontal axis thereof, so as to open and close the air inlet 11a. There may be a plurality of flaps 12. In this case, the flaps 12 may be arranged vertically in the air inlet 11a of the housing 11. Any one of the flaps 12 may be a drive flap which opens or closes by receiving power from a rotary motor of the flap actuator 13 through a powertrain, and the other one may be a slave flap which is connected to through a linkage of the flap actuator 13 to the drive flap to open and close.

The flap actuator 13 rotates the flap 12. The flap actuator 13 includes: a rotary motor which is mounted in the housing 11 for normal or reverse rotation; a powertrain for transmitting torque of the rotary motor to the drive flap; and the linkage for connecting the drive flap and the slave flap, so that the slave flap may open and close in connection with the opening and closing of the drive flap.

The powertrain, which includes a gear set, may transmit the torque of the rotary motor to the drive flap. As the linkage includes a drive link which is fixed to a rotation shaft of the drive flap; a slave link which is fixed to a rotation shaft of the slave flap; and an intermediate link which transmits the torque of the drive link to the slave link, the slave flap may open and close in connection with the opening and closing of the drive flap.

The flap position sensing device 100 according to an embodiment of the present invention is mounted in the slave flap, among the flaps 12, so as to sense the position of the slave flap. The flap position sensing device 100 may also be mounted in the drive flap, or may be mounted separately in the slave flap and the drive flap to sense the position of a corresponding flap.

Figure 3:
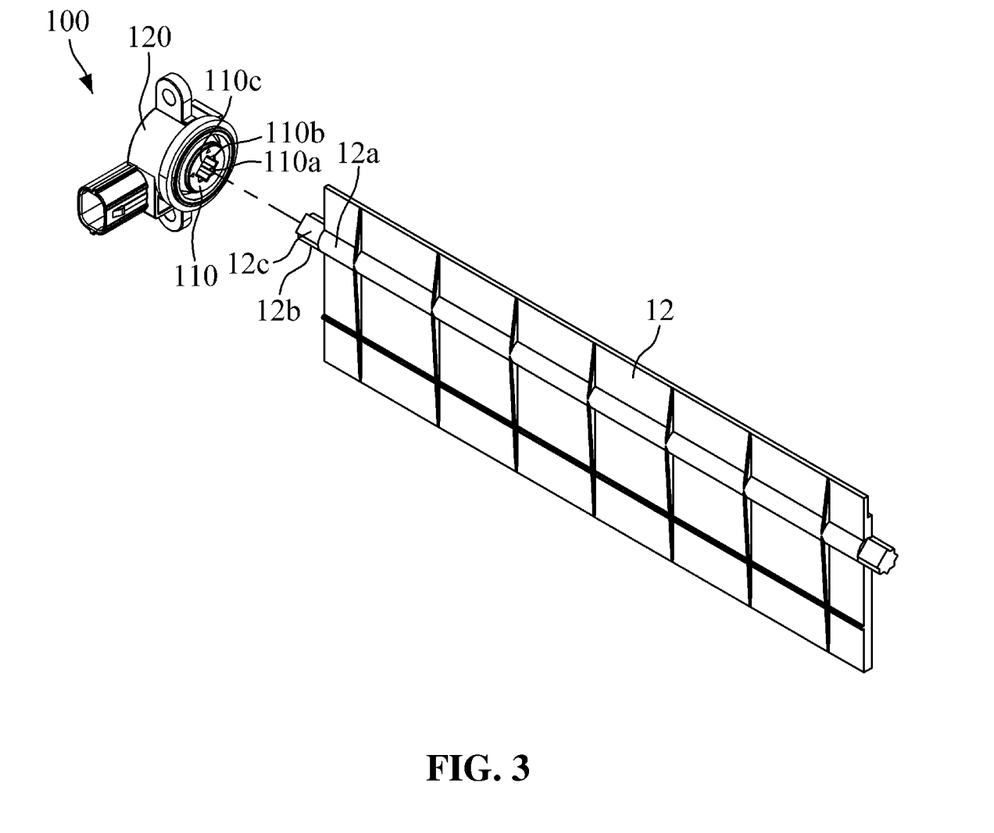
FIG. 3 is a perspective view of a flap position sensing device according to an embodiment of the present invention.
Figure 4:
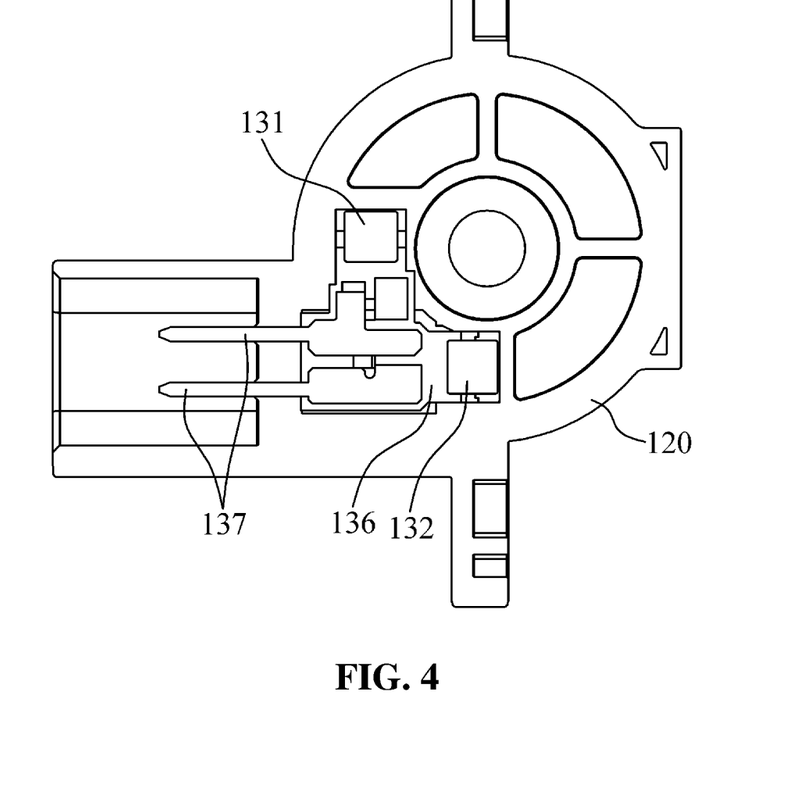
FIG. 4 is a cross-sectional view of FIG. 3.
Figure 5:
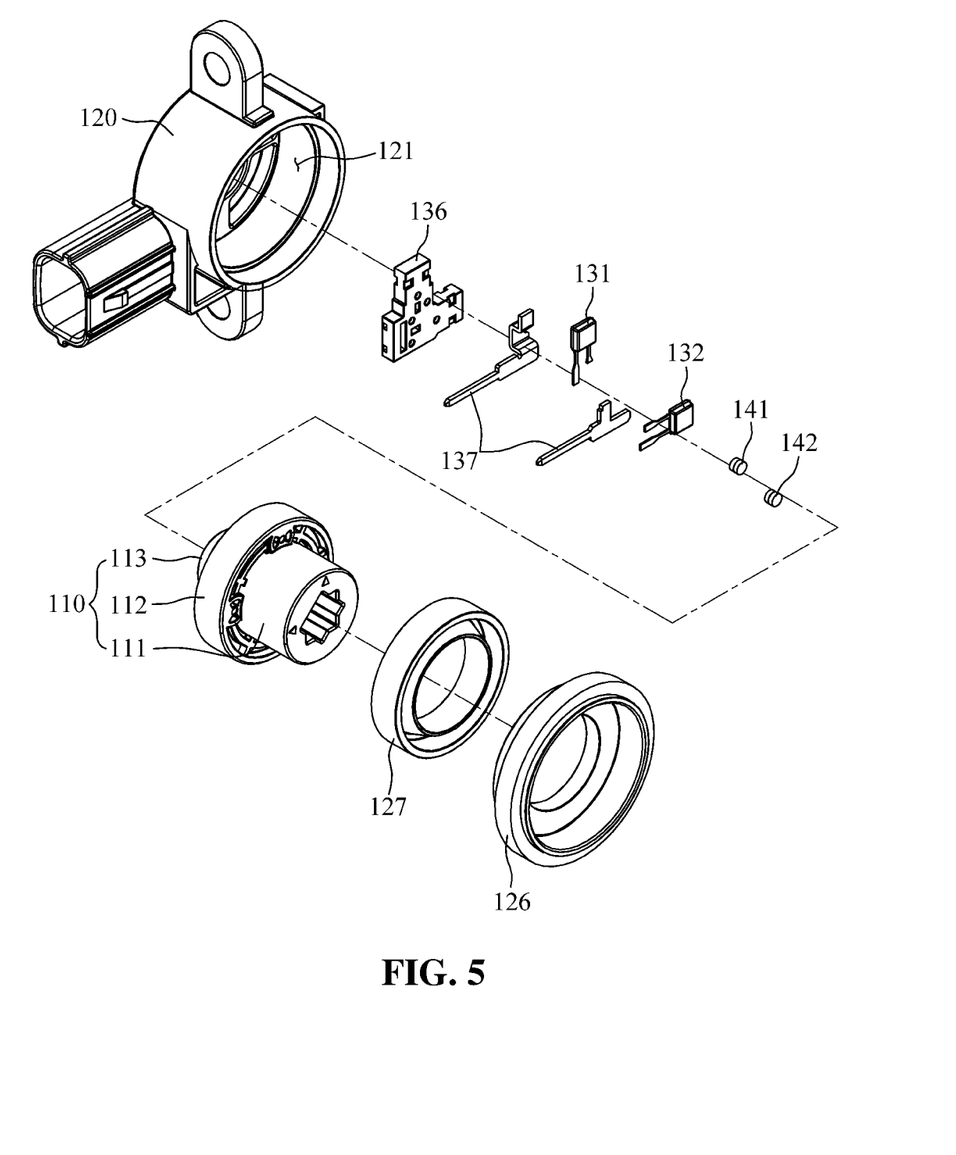
FIG. 5 is an exploded perspective view of FIG. 3.
Figure 6:
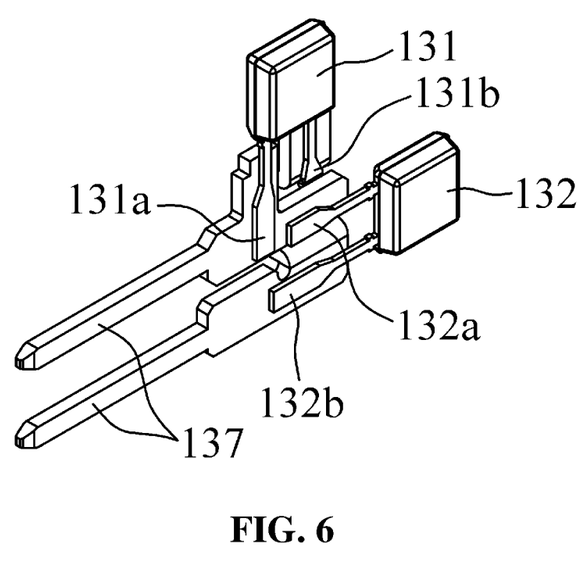
FIG. 6 is a perspective view of FIG. 4, showing that a first hall sensor and a second hall sensor are connected to connector terminals.
Figure 7:
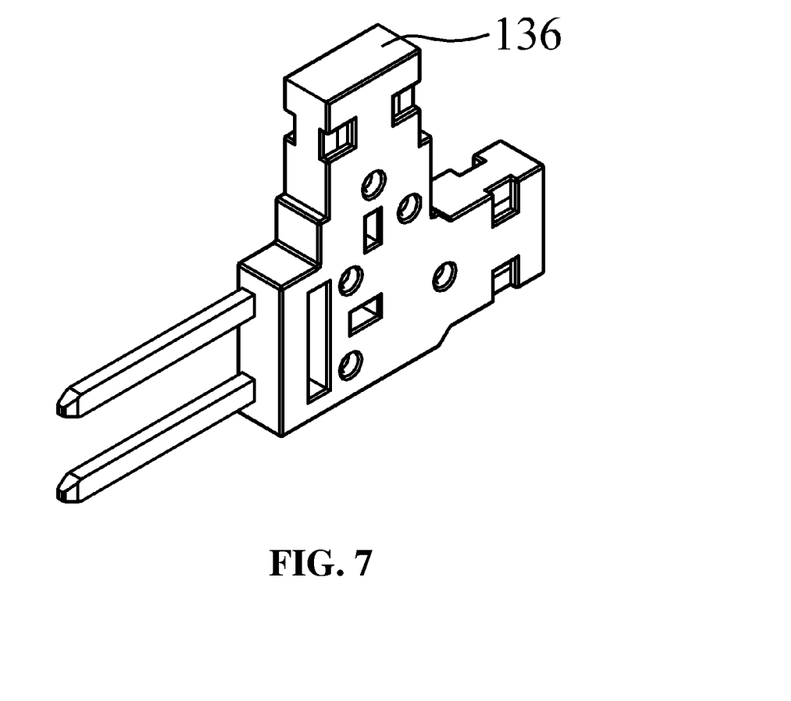
FIG. 7 is a perspective view of FIG. 6, showing that a first hall sensor, a second hall sensor, and connector terminals are molded into a pre-molding body.

FIG. 3 is a perspective view of a flap position sensing device according to an embodiment of the present invention; FIG. 4 is a cross-sectional view of FIG. 3; FIG. 5 is an exploded perspective view of FIG. 3; FIG. 6 is a perspective view of FIG. 4, showing that a first hall sensor and a second hall sensor are connected to connector terminals; and FIG. 7 is a perspective view of FIG. 6, showing that a first hall sensor, a second hall sensor, and connector terminals are molded into a pre-molding body.

Referring to FIGS. 3 to 7, the flap position sensing device 100 according to an embodiment of the present invention includes a rotating body 110, a sensor casing 120, a first hall sensor 131, a second hall sensor 132, a first permanent magnet 141, and a second permanent magnet 142.

The rotating body 110 rotates the flap 12 by receiving torque while the rotating body 110 is coaxially fixed to the rotation shaft 12a of the flap 12. The rotating body 110 is injection-molded using a resin material. During the injection molding of the rotating body 110, the first permanent magnet 141 and the second permanent magnet 142 are inserted to be integrally is formed with the rotating body 110.

A central groove 110a of the rotating body 110 is coupled to the rotation shaft 12a of the flap 12 with a concave-convex structure, such that the rotating body 110 may be slip-resistant with respect to the rotation shaft 12a of the flap 12. The central groove 110a of the rotating body 110 has insertion grooves 110b which are formed with a predetermined pattern on a portion of an inner circumference of the central groove 110a, and a position setting groove 110c is formed on another portion of the inner circumference. The rotation shaft 12a of the flap 12 has insertion protrusions 12b, which are inserted into the insertion grooves 110b, and a position setting protrusion 12c which is inserted into the position setting groove 110c.

Here, while the first permanent magnet 141 and the second permanent magnet 142 are disposed in a set position for sensing an open and close position of the flap 12, the position setting protrusion 12c of the rotating shaft 12a is inserted into the position setting groove 110c of the rotating body 110, such that the first permanent magnet 141 and the second permanent magnet 142 may be accurately disposed in the set position.

The rotating body 110 has: a coupling shaft part 111 which is coupled to the rotation shaft 12a of the flap 12; a first support shaft part 112 which has a greater outer diameter than the coupling shaft part 111 and is coaxially connected to the coupling shaft part 111; and a second support shaft part 113 which has a smaller outer diameter than the first support shaft part 112 and is coaxially connected to the first support shaft part 112. In this case, the second support shaft part 113 may have a smaller outer diameter than the coupling shaft part 111.

The sensor casing 120 is fixed to the housing 11 to rotatable support the rotating body 110. The sensor casing 120 is injection-molded using a resin material. During the injection modeling of the sensor casing 120, the first hall sensor 131 and the second hall sensor 132 are inserted such that the sensor casing 120 may be integrally formed therewith.

The sensor casing 120 has an internal space with one open side. The sensor casing 120 accommodates the rotating body 110 which is inserted through the one open side of the sensor casing 120. The sensor casing 120 has a guide groove 121 which is formed therein for guiding rotation of the rotating body 110. The guide groove 121 of the sensor casing 120 is formed on a rotation trajectory of the first support shaft part 112 and the second support shaft part 113, thereby guiding rotation of the rotating body 110 while the first support shaft part 112 and the second support shaft part 113 are seated.

The one open side of the sensor casing 120 may be covered by a cover 126. The cover 126 may cover the open side of the sensor casing 120 while the coupling shaft part 111 of the rotating body 110 is withdrawn through a central opening of the cover 126. A space between the central opening of the cover 126 and the coupling shaft part 111 of the rotating body 110 may be sealed with a sealing member 127. Accordingly, the rotating body 110 may rotate while being sealed with respect to the central opening of the cover 126.

The first hall sensor 131 and the second hall sensor 132 are integrally formed with the sensor casing 120 by insert injection molding. Here, while being molded into a pre-molding body 136, formed of a resin material, by insert injection molding, the first hall sensor 131 and the second hall sensor 132 may be integrally formed with the sensor casing 120 by an overmold injection molding process. That is, after the pre-molding body 136 is injection-molded by injection molding for the pre-molding body while the first hall sensor 131 and the second hall sensor 132 are inserted into an injection mold for the pre-molding body, the sensor casing 120 to may be injection molded by injection molding for the sensor casing while the pre-molding body 136 is inserted into an injection mold for the sensor casing.

Accordingly, after being primarily molded into the pre-molding body 136, the first hall sensor 131 and the second hall sensor 132 are secondarily overmolded into the sensor casing 120, such that thermal damage may be prevented during the injection molding of the sensor casing 120. Further, the first hall sensor 131 and the second hall sensor 132 may be integrally formed with the sensor casing 120 while being molded into the sensor casing 120, thereby preventing breakdown due to water permeation.

The first hall sensor 131 is disposed at a position corresponding to an open position of the flap 12, and the second hall sensor 132 is disposed at a position corresponding to a closed position of the flap 12. That is, the first hall sensor 131 and the second hall sensor 132 are spaced apart from each other by an opening and closing angle of the flap 12, e.g., 90 degrees, so as to be disposed corresponding to the open position and the closed position, respectively, of the flap 12. The first hall sensor 131 and the second hall sensor 132 may sense a magnetic field based on the Hall effect, which is a phenomenon that occurs when a magnetic field is applied to a current flowing conductor, voltage is produced in a direction perpendicular to both the current and the magnetic field. The first hall sensor 131 and the second hall sensor 132 may form a pair.

The first permanent magnet 141 and the second permanent magnet 142 are integrally formed with the rotating body 110 by insert injection molding. While the first permanent magnet 141 and the second permanent magnet 142 are inserted into an injection mold for the rotating body, the rotating body 110 may be injection-molded by injection molding for the rotating body. The first permanent magnet 141 and the second permanent magnet 142, which are integrally formed with the rotating body 110, may rotate along with the flap 12 when the rotating body 110 rotates by rotation of the flap 12.

The first permanent magnet 141 and the second permanent magnet 142 are used for generating a magnetic field. The first permanent magnet 141 and the second permanent magnet 142 are spaced apart from each other by an opening and closing angle of the flap 12, e.g., 90 degrees, and are disposed to interact with the first hall sensor 131 and the second hall sensor 132 according to the opening and closing of the flap 12, so as to sense an open position, a closed position, and other positions of the flap 12. Any one of the first permanent magnet 141 and the second permanent magnet 142 may be disposed to face the first hall sensor 131 or the second hall sensor 312, and the other one may be spaced apart therefrom by an opening and closing angle of the flap 12 in an opening direction of the flap 12. The first permanent magnet 141 and the second permanent magnet 142 may form a pair.

Figure 8:
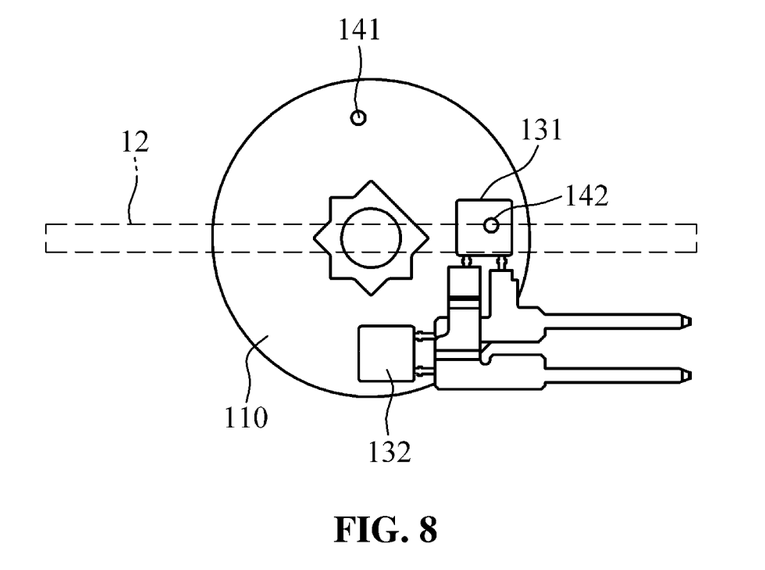
FIG. 8 is a view showing an example of arrangement of a first permanent magnet and a second permanent magnet in an open position of a flap.

For example, the first permanent magnet 141 may be spaced apart from the first hall sensor 131 by an opening and closing angle of the flap 12 in an open position and an opening direction of the flap 12; and the second permanent magnet 142 may be disposed to face the first hall sensor 131 in an open position of the flap 12.

Figure 9:
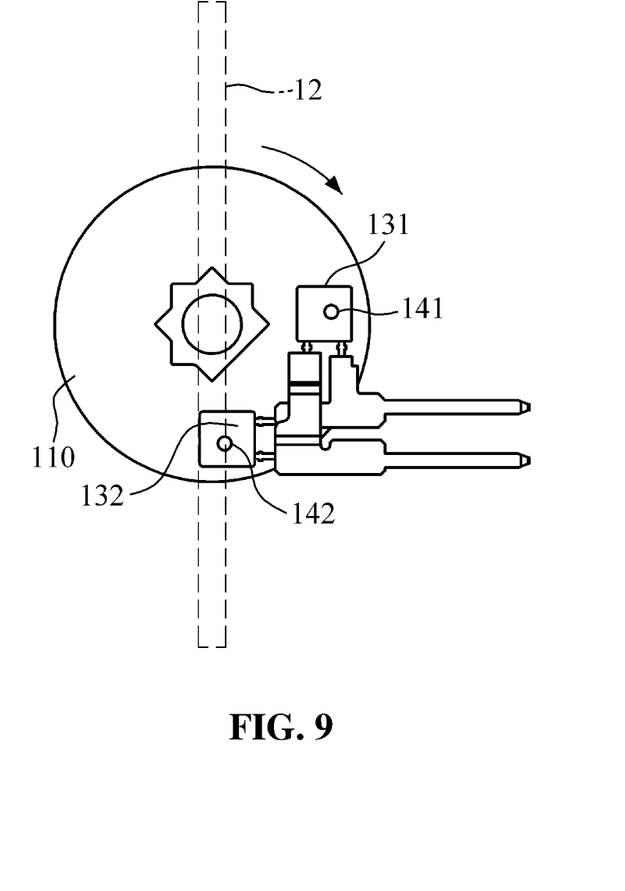
FIG. 9 is a view showing movement of the first permanent magnet and the second permanent magnet FIG. 8 according to a closed position of a flap.
Figure 10:
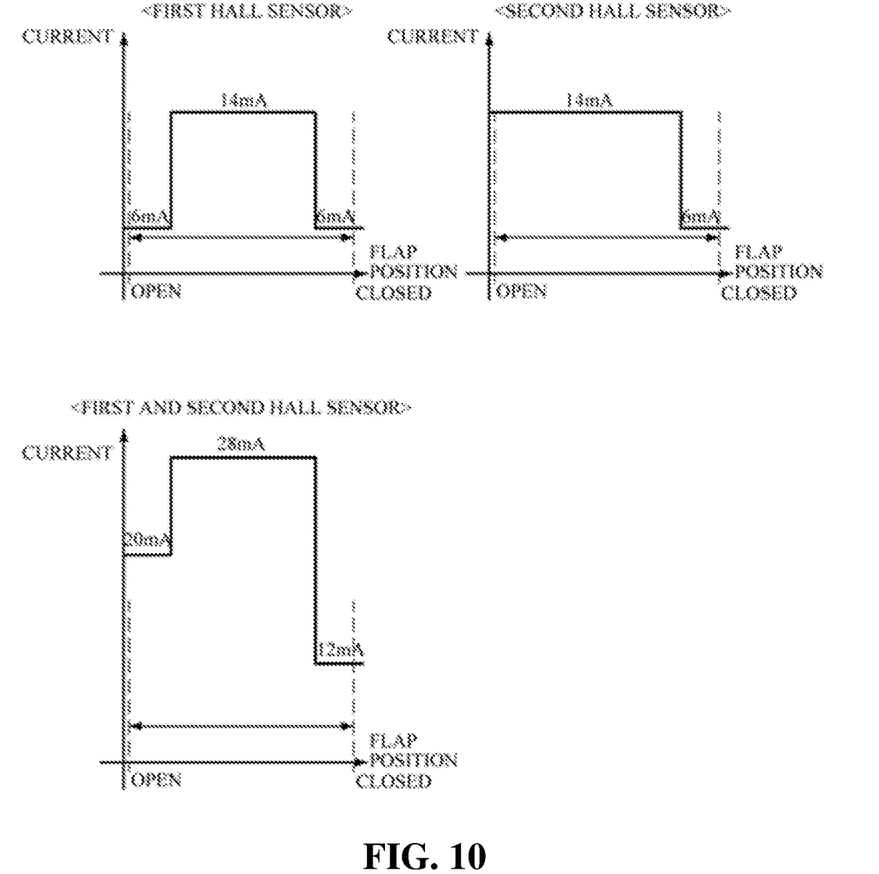
FIG. 10 is a graph showing currents output from a first hall sensor and a second hall sensor respectively according to positions of a flap, and a summed current obtained by summing currents output from the first hall sensor and the second all sensor.

Referring to FIGS. 8 to 10, a current signal, which is output when the first hall sensor 131 is close to the first permanent magnet 141, is defined as S1, and a current signal, which is output when the first hall sensor 131 is spaced apart from the first permanent magnet 141, is defined as S2. Further, a current signal, which is output when the second hall sensor 132 is close to the first permanent magnet 141 and the second permanent magnet 142, is defined as S1, and a current signal, which is output when the second hall sensor 132 is spaced apart from the first permanent magnet 141 and the second permanent magnet 142, is defined as S2.

Here, the current signals, output from the first hall sensor 131 and the second hall sensor 132, may be provided to a controller. The current signals S1 and S2 may be converted into voltage by resistance, to be provided to the controller. The controller may be implemented in the form of control logic and may be mounted in an Engine Management System (EMS) of a vehicle.

Upon detecting that the signal S1 is output from the first hall sensor 131 and the signal S2 is output from the second hall sensor 132, the controller may determine that the flap 12 is in an open position. Upon detecting that the signal S1 is output from both of the first hall sensor 131 and the second hall sensor 133, the controller may determine that the flap 12 is in a closed is position. Upon detecting that the signal S2 is output from both of the first hall sensor 131 and the second hall sensor 133, the controller may determine that the flap 12 is in a position other than the open position and the closed position, i.e., an intermediate position, of the flap 12.

The controller may add up the signals output from the first hall sensor 131 and the second hall sensor 132 in the open position, the closed position, and other positions of the flap 12. A signal value, obtained by summing the signals output from the first hall sensor 131 and the second hall sensor 132 in the open position of the flap 12, is S1+S2; a signal value, obtained by summing the signals output from the first hall sensor 131 and the second hall sensor 132 in the closed position of the flap 12, is S1+S1; and a signal value, obtained by summing the signals output from the first hall sensor 131 and the second hall sensor 132 in the intermediate position of the flap 12, is S2+S2.

For example, if S1 is 6 mA, S2 is 14 mA, and resistance is 100Ω, a summed signal value obtained in the open position of the flap 12 is 2.0 V; a summed signal value obtained in the closed position of the flap 12 is 1.2 V; and a summed signal value obtained in the intermediate position of the flap 12 is 2.8 V. As described above, the signal values, which are obtained by summing the signals output from the first hall sensor 131 and the second hall sensor 132, are different depending on the open position, the closed position, and other positions of the flap 12, such that it is possible to accurately detect whether the flap 12 is in the open position, the closed position, or other positions.

Accordingly, if the flap 12 may not open or close normally due to circumstances such as damage to the flap 12 or the linkage, the flap position sensing device 100 may sense abnormality in the flap 12 based on position information of the flap 12, and may perform appropriate actions, thereby preventing in advance serious problems, such as an overheated engine caused when outside air, which is required to cool the engine, is not introduced, and the like.

While being connected to the connector terminals 137 and molded into the pre-molding body 136, formed of a resin material, by insert injection molding, the first hall sensor 131 and the second hall sensor 132 may be integrally formed with the sensor casing 120 by an overmold injection molding process. Accordingly, the connector terminals 137 may be integrally formed with the sensor casing 120 along with the first hall sensor 131 and the second hall sensor 132. In this manner, a printed circuit board for mounting the first hall sensor 131, the second hall sensor 132, and the connector terminals 137 may be omitted, thereby reducing a manufacturing process and the size of the flap position sensing device 100.

The first hall sensor 131 has one power terminal 131a and one grounding terminal 131b. The second hall sensor 132 has one power terminal 132a and one grounding terminal 132b. The power terminals 131a and 132a of the first hall sensor 131 and the second hall sensor 132 may be connected as a group to one connector terminal 137, and the grounding terminals 131b and 132b thereof may be connected as a group to the other connector terminal 137.

That is, the power terminal 131a and the power terminal 132a of the first hall sensor 131 and the second hall sensor 132 may be connected commonly to the one connector terminal 137, and the grounding terminal 131b and grounding terminal 132b thereof may be connected commonly to the other connector terminal 137. Thus, only two connector terminals 137 are provided to supply a current, output from the first hall sensor 131 and the second hall sensor 312, to the controller. In the embodiment of the present invention, rather than using three or four connector terminals 137 to be connected to the power terminals 131a and 132a and the grounding terminals 131b and 132b of the first hall sensor 131 and the second hall sensor 132, the number of connector terminals 137 to be connected thereto may be reduced, such that the size of the flap position sensing device 100 may be reduced.

Figure 11:
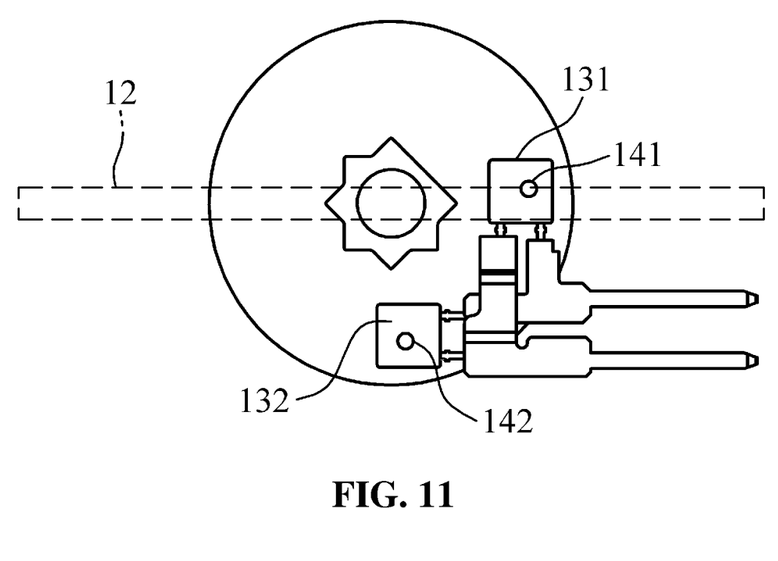
FIG. 11 is a view showing another example of arrangement of a first permanent magnet and a second permanent magnet in an open position of a flap.
Figure 12:
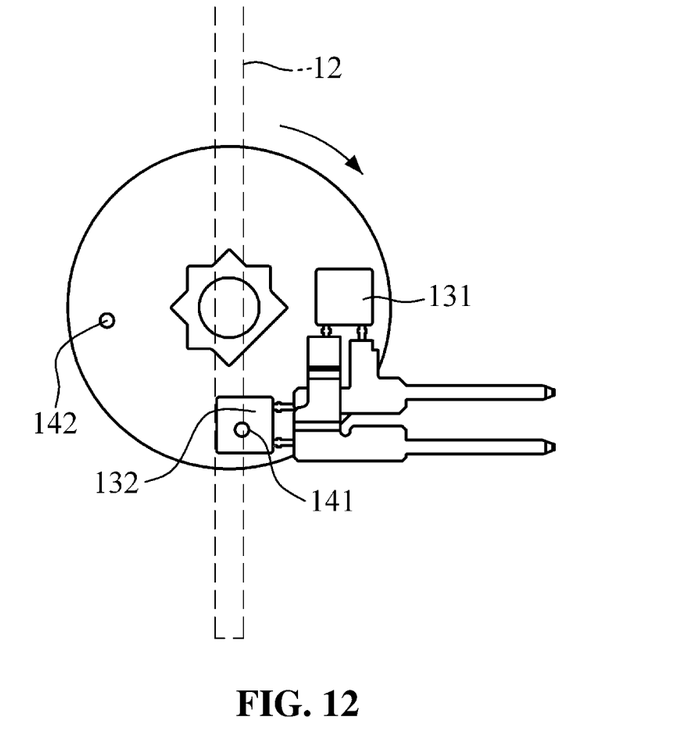
FIG. 12 is a view showing movement of the first permanent magnet and the second permanent magnet of FIG. 11 according to a closed position of a flap.

In another example, as illustrated in FIGS. 11 and 12, the first permanent magnet 141 may be disposed to face the first hall sensor 131 in the open position of the flap 12, and the second permanent magnet 142 may be disposed to face the second hall sensor 132 in the open position of the flap 12. In this case, upon detecting that the signal S1 is output from both of the first hall sensor 131 and the second hall sensor 132, the controller may determine that the flap 12 is in the open position. Upon detecting that the signal S2 is output from the first hall sensor 131 and the signal S1 is output from the second hall sensor 132, the controller may determine that the flap 12 is in the closed position. Upon detecting the signal S2 is output from both of the first hall sensor 131 and the second hall sensor 132, the controller may determine that the flap 12 is in the intermediate position.

Further, if S1 is 6 mA, S2 is 14 mA, and resistance is 100Ω, a summed signal value obtained in the open position of the flap 12 is 1.2 V; a summed signal value obtained in the closed position of the flap 12 is 2.0 V; and a summed signal value obtained in the intermediate position of the flap 12 is 2.8 V.

As described above, the signal values, which are obtained by summing the signals output from the first hall sensor 131 and the second hall sensor 132, are different depending on the open position, the closed position, and other positions of the flap 12, such that it is possible to accurately detect whether the flap 12 is in the open position, the closed position, or other positions.

If the first permanent magnet 141 and the second permanent magnet 142 form a pair, the arrangement of the first permanent magnet 141 and the second permanent magnet 142 in this embodiment is inverted from the aforementioned arrangement of the first permanent magnet 141 and the second permanent magnet 142. Accordingly, even when the position of the rotating body 110 is set through the position setting groove 110c to be mounted on either the left side or the right side of the flap 12, if the sensor casing 120 is provided corresponding thereto, positions of the flap 12 may be sensed.

A method of manufacturing the flap position sensing device 100 according to an embodiment of the present invention will be described below.

The sensor casing 120 is injection-molded using a resin material. During the injection molding of the sensor casing 120, the first hall sensor 131 and the second hall sensor 132 are inserted to be integrally formed with the sensor casing 120 while the first hall sensor 131 and the second hall sensor 132 are spaced apart from each other by an opening and closing angle of the flap 12. That is, the first hall sensor 131 and the second hall sensor 132 are disposed corresponding to the open position and the closed position, respectively, of the flap 12 based on the position of the sensor casing 120 fixed to the housing 11.

In this case, the first hall sensor 131 and the second hall sensor 132 are connected to the connector terminals 137. Here, the power terminals of the first hall sensor 131 and the second hall sensor 132 are connected as a group to one connector terminal 137, and the grounding terminals of the first hall sensor 131 and the second hall sensor 132 are connected as a group to the other connector terminal 137. Then, during injection molding of the pre-molding body 136, the first hall sensor 131 and the second hall sensor 132, which are connected to the connector terminals 137, may be inserted to be molded into the pre-molding body 136. Subsequently, by overmold injection molding of the sensor casing 120 with respect to the pre-molding body 136, the pre-molding body 136 may be integrally formed with the sensor casing 120.

Specifically, after the pre-molding body 136 is injection-molded by injection molding for the pre-molding body while the first hall sensor 131 and the second hall sensor 132 are inserted into an injection mold for the pre-molding body, the sensor casing 120 may be injection molded by injection molding for the sensor casing while the pre-molding body 136 is inserted into an injection mold for the sensor casing.

The rotating body 110 is injection-molded using a resin material. During the injection molding of the rotating body 110, while the first permanent magnet 141 and the second permanent magnet 142 are spaced apart from each other by an opening and closing angle of the flap 12, and are disposed to interact with the first hall sensor 131 and the second hall sensor 132 to sense the open position, the closed position, and other positions of the flap 12, the first permanent magnet 141 and the second permanent magnet 142 may be inserted to be integrally formed with the rotating body 110. In this case, while being inserted into an injection mold for the rotating body, the rotating body 110 may be injection-molded by injection molding for the rotating body.

As described above, the sensor casing 120, which is integrally formed with the first hall sensor 131 and the second hall sensor 132, and the rotating body 110, which is integrally formed with first permanent magnet 141 and the second permanent magnet 142, are coupled to the rotation shaft 12a of the flap 12, thereby sensing the positions of the flap 12.

The present invention has been described herein with regard to preferred embodiments illustrated in the drawings. However, it will be understood by those skilled in the art that these embodiments are simply illustrative, and various modifications and other equivalent embodiments are possible. Therefore, it is obvious that the true scope of the invention should be defined only by the appended claims, and equivalents thereof.

What is claimed is:

1. A flap position sensing device of an active air flap system comprising a housing having an air inlet which allows outside air entering through a radiator grille to pass, a flap which rotates to reciprocate between an open position for opening the air inlet of the housing and a closed position for closing the air inlet of the housing, and a flap actuator for rotating the flap, the flap position sensing device comprising:
    a rotating body which is formed of a resin material, and rotates the flap by receiving torque while the rotating body is coaxially fixed to a rotation shall of the flap;
    a sensor casing which is formed of a resin material, and is fixed to the housing to rotatably support the rotating body;
    a first hall sensor and a second hall sensor which are integrally formed with the sensor casing, and are disposed corresponding to the open position and the closed position, respectively, of the flap; and
    a first permanent magnet and a second permanent magnet which are integrally formed with the rotating body, are spaced apart from each other by an opening and closing angle of the flap, and are disposed to interact with the first hall sensor and the second hall sensor according to opening and closing of the flap, so as to sense the open position, the closed position, and other positions of the flap.

2. The flap position sensing device of claim 1, wherein power terminals of the first hall sensor and the second hall sensor are connected as a group to one connector terminal, and grounding terminals of the first hall sensor and the second hall sensor are connected as a group to another connector terminal.

3. A method of manufacturing a flap position sensing device of an active air flap system comprising a housing having an air inlet which allows outside air entering through a radiator grille to pass, a flap which rotates to reciprocate between an open position for opening the air inlet of the housing and a closed position for closing the air inlet of the housing, and a flap actuator for rotating the flap, the method comprising:
    during injection molding of a sensor casing, while a first hall sensor and a second hall sensor are spaced apart from each other by an opening and closing angle of the flap, the first hall sensor and the second hail sensor are inserted to be integrally formed with the sensor casing; and
    during injection molding of a rotating body, while a first permanent magnet and a second permanent magnet are spaced apart from each other by an opening and closing angle of the flap, and are disposed to interact with the first hall sensor and the second hall sensor to sense the open position, the closed position, and other positions of the flap, the first permanent magnet and the second permanent magnet are inserted to be integrally formed with the rotating body.

4. The method of claim 3, wherein the integrally forming of the first hall sensor and the second sensor with the sensor casing comprises:
    connecting the first hall sensor and the second hall sensor to connector terminals;
    during injection molding of a pre-molding body, inserting the first hall sensor and the second hall sensor, connected to the connector terminals, to be molded into the pre-molding body; and
    overmold injection molding of the sensor casing with respect to the pre-molding body, so that the pre-molding body is integrally formed with the sensor casing.

5. The method of claim 4, wherein the connecting of the first hall sensor and the second hall sensor to the connector terminals comprises connecting power terminals of the first hall sensor and the second hall sensor as a group to one connector terminal, and connecting grounding terminals of the first hall sensor and the second hall sensor as a group to another connector terminal.

* * * * *